UNITED STATES PATENT OFFICE

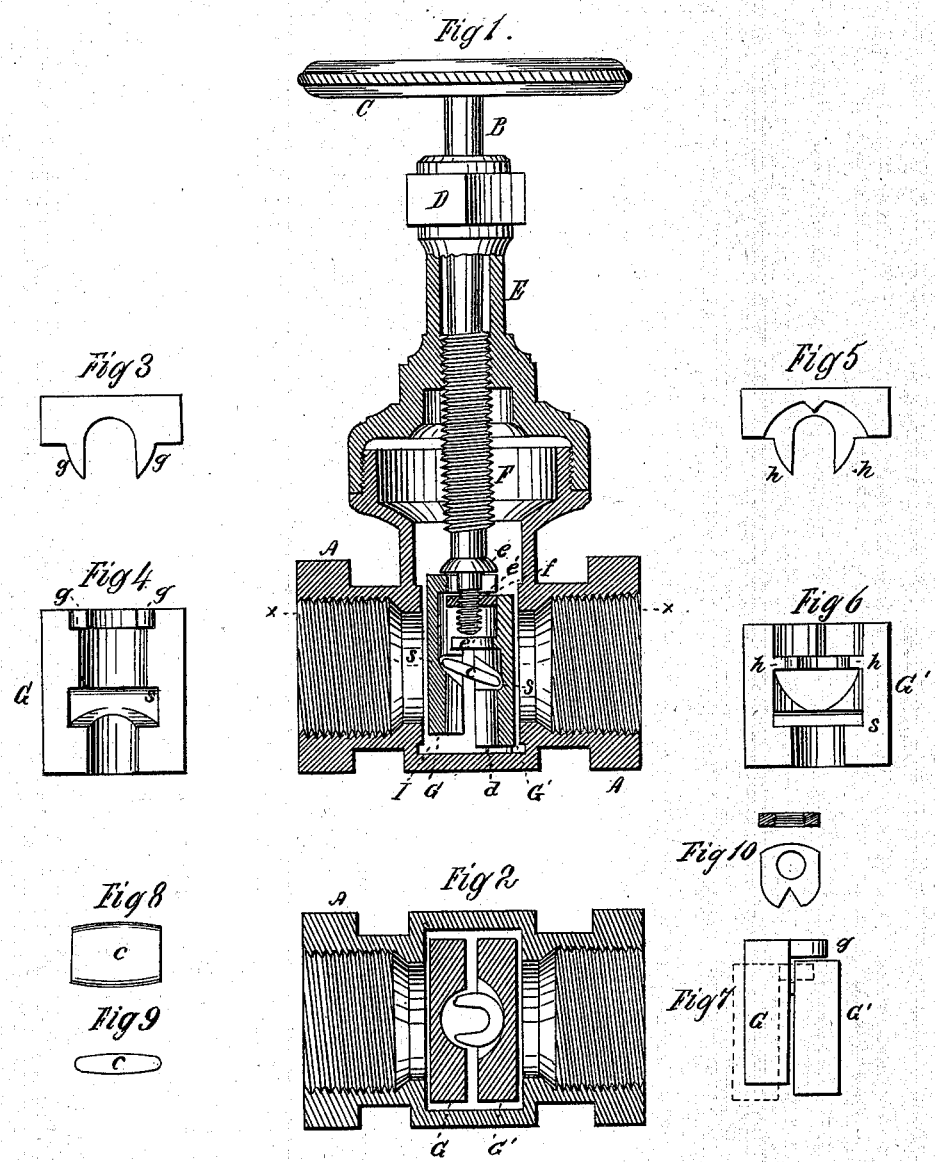

E. FRANK SPAULDING, OF CAMBRIDGEPORT, MASSACHUSETTS.

IMPROVEMENT IN STEAM AND OTHER VALVES.

Specification forming part of Letters Patent No. 139,339, dated May 27, 1873; application filed November 14, 1872.

*To all whom it may concern:*

Be it known that I, E. FRANK SPAULDING, of Cambridgeport, in the county of Middlesex, and State of Massachusetts, have invented a new and useful Improvement in Steam and other Valves, and do hereby declare the same to be fully described in the following specification, and represented in the accompanying drawings, in which—

Figure 1 denotes a central and vertical section of a valve constructed in accordance with my invention. Fig. 2 is a horizontal section on line $x\,x$, of Fig. 1. Figs. 3 and 4 are top and inside views of one of the valve-plates. Figs. 5 and 6 are similar views of the other valve-plate. Fig. 7 is an edge-view of the duplex-valve or valve-plates, showing the position of the parts when opened, and when closed against the seats, the dotted lines showing the latter. Fig. 8 is a top view, and Fig. 9 an end view of the wedge.

My invention has reference to that class of stop-cocks or valves in which two independent disks or valve-plates are employed to close upon two opposite valve-seats, disposed upon the inner faces of the induction and eduction ports of the water or steam-passage; and my invention consists in the peculiar construction, arrangement, and combination with each other of certain mechanical devices, in manner as hereinafter fully described and claimed, whereby I produce an improved valve, simple and effective in operation, the essential features whereof consist in combining with the actuating-stem and its collar, a screw and nut, (to operate with the lugs or ears formed on the internal surfaces of the disks or valve-plates,) and a wedge interposed between the disks and loosely pivoted thereto, and operating with the stem to close them upon their seats until relieved by the retroaction of the stem.

In the said drawing, A denotes the body or the case of the valve through which a straight unobstructed passage for the flowage of water, steam, &c., is made; B is the valve-stem which is provided at its upper end with a hand-wheel, C. The said stem extends down through its stuffing-box D, the neck E, and chamber F, and has a male screw cut upon it near its middle part, as shown in Fig. 1, such screw operating with a female screw formed within the bonnet or neck E. $e$ is an annular shoulder made upon the stem, near its lower part. G G' are the two valve-plates, the outer faces of the same being plain, their respective inner faces having the peculiar shape as shown in Figs. 3 and 4, 5 and 6. $c$ is a flat wedge or lever having each of its ends of a curved or convex shape, such wedge having its extremities resting within chambers or sockets, $s\,s$, formed in the inner faces of the disks or plates, as shown in Fig. 1. The said chambers are so arranged as to cause the wedge to stand diagonally, in order that when one of the valve-plates has reached its lowest position, viz., resting upon the lug $d$, the further descent of its fellow-plate shall cause the wedge, as it approaches nearer a horizontal plane to force asunder the plates and close them upon their seats with any desired degree of force. The lower portion of the stem is provided with a male screw, $e'$, which works in a nut, $f$, which is disposed between ears or abutments, $g\,h$, formed respectively on the inner faces of the two valve-plates G and G' as shown in Figs. 3, 4, 5, and 6.

From inspection of the drawing it will be seen, that in opening and closing the duplex plug, one portion of the plug, or one of the valve-plates, moves in advance of the other. The nut $f$, resting upon the abutment of the plate G', forces the latter in advance of the plate G, down upon the lug $d$, on the bottom of the chamber I, the screw $e'$, working through the nut $f$, allowing the annular shoulder $e$, of the stem to come in contact with the ears on the plate G, and by the further rotation of the hand-wheel to force downward the said plate G, and thus cause the wedge $c$ to force the two valves upon their seats with the requisite degree of force. It will also be seen, that by simply rotating the hand-wheel in the opposite direction, the nut $f$, operating upon the ears of the valve-plate last closed, readily raises such, and instantly relieves the valves from the pressure of the wedge.

By forming the nut $f$ with the angular recess as shown in Fig. 10, to fit upon a vertical rib, $l$, formed on the inner face of the valve-plate G', the nut $f$ is prevented from rotating upon the screw $e$, the nut moving up and down on the screw as the valves are raised or lowered; the nut being so arranged upon the screw that the rotation of the stem shall cause it to impinge against the under surface of the lugs of the plate G when the valves are closed, but when the valves are open it shall rest upon the upper surface of the ears on the disk G', whereby the same is ready when the stem may be next forced downward to impel the disk down to its seat in advance of its fellow.

Having described my invention, what I claim is—

The above-described improved stop-valve, consisting of the case A, the stem B provided with the annular shoulder $e$, the screw $e'$, and nut $f$, arranged as described, the valve-plates or disks G G' furnished with ears $g\ h$, disposed thereon as shown, and the wedge $c$, formed and applied to the disks as specified, the whole being combined and arranged for conjoint action as set forth.

E. FRANK SPAULDING.

Witnesses:
   F. P. HALE,
   F. C. HALE.